May 26, 1953 J. McDONALD 2,640,045
MANUFACTURE OF PHENOL-FURFURAL RESINS
Filed May 20, 1950
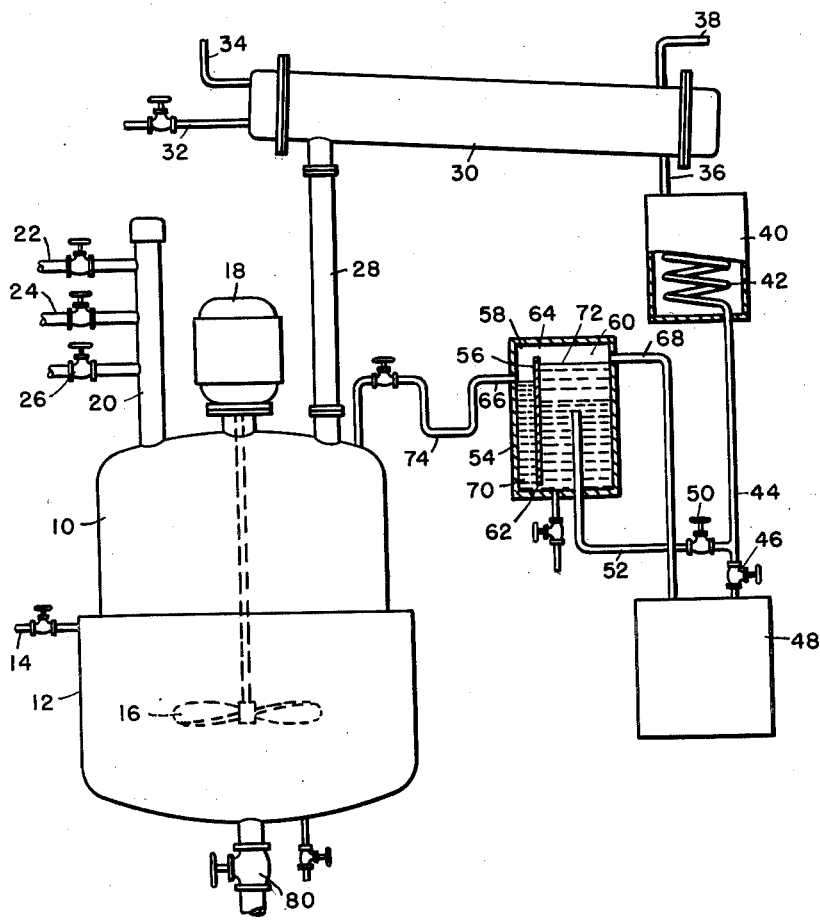
INVENTOR
Jack McDonald.
BY
Frederick Shapoe
ATTORNEY Patented May 26, 1953

2,640,045

UNITED STATES PATENT OFFICE 2,640,045

MANUFACTURE OF PHENOL-FURFURAL RESINS

Jack McDonald, Pittsburgh, Pa., assignor to Westinghouse Electric Corporation, East Pittsburgh, Pa., a corporation of Pennsylvania Application May 20, 1950, Serial No. 163,178

2 Claims. (Cl. 260—56)

This invention relates to the manufacture of phenol-furfural resins.

Resinous reaction products of phenol-furfural have been prepared heretofore by heating a mixture of the phenol and furfural to temperatures at which reaction takes place using reflux to maintain the reaction temperature within desired limits and the reflux condensate, comprising a large proportion of water, being returned to the reaction mixture. Since substantial amounts of water are returned to the reacting phenol and furfural, the temperature of reaction is lowered considerably more than if the water were not so returned. Due to such low temperatures in the reaction mixture, the processing time is continued for many hours, usually over three hours and sometimes to four hours before the phenol and furfural have reacted sufficiently to form a low resinous polymer that may be subjected to the next stage in the reaction. After a sufficiently reacted low polymer of phenol and furfural has been reached, the reaction temperature being from 110° C. to 115° C., vacuum is applied to the mixture to remove the water therefrom. The temperature of the reaction mixture drops considerably due to the application of vacuum and external heat is applied to increase the reaction temperature after a substantial amount of the water has been removed. Approximately an hour is required to bring the temperature of the reaction mixture up to 125° C. to 130° C. As the last traces of the water are removed from the reaction mixture, the temperature thereof increases to approximately 140° C. to 145° C. at which temperature the reaction mixture is maintained for two to three hours to produce a suitably reacted phenol-furfural resin having a ball and ring temperature of from 80° C. to 125° C.

The vacuum dehydration of the phenol-furfural reaction mixture removes a considerable amount of phenol, furfural and partially reacted phenol-furfural resin, as well as considerable amounts of water. In a charge comprising 160 gallons of phenol and furfural combined and reacted in accordance with the best prior art practice, I have found that there is unavoidably produced on the average 28 gallons of water insoluble phenol, furfural and phenol-furfural low polymers with about 8 to 10% of water. Due to the large amount of water in this mixture, it is not practical to use it in making up the next charge for the reaction vessel, since it would lower the temperature of reaction to about 100° C. and thereby prolong the reaction excessively and this quantity of phenol-furfural is usually discarded. It will be appreciated that this constitutes a substantial loss.

I am aware of the suggestions in Patent 1,793,715 which describes two processes; the first process employs such high temperatures (180° C. to 190° C.) and is so lengthy it is not as economical as conventional refluxing which is widely used, and the other process using temperatures above 150° C. is not readily controlled and is not suitable for preparing thermoplastic, molding powders. The present invention avoids the defects of this patent since I am able to reduce the reaction time while maintaining control of the reaction with the product resulting being of superior quality.

The object of this invention is to provide for rapidly and efficiently reacting phenol with furfural into a moldable resinous product with little wasted material.

A further object of this invention is to reduce the time required to react with furfural to a predetermined degree and quality of resinification.

A still further object of the invention is to provide apparatus for decanting separable liquid mixtures.

Other objects of the invention will, in part, be obvious and, in part, appear hereinafter.

For a better understanding of the nature and object of the invention, reference should be had to the following detailed drawing and description in which the single figure is a view in elevation partly in section of apparatus suitable for practicing the invention.

I have discovered that the reaction of phenol with furfural may be markedly improved by maintaining a temperature not exceeding 150° C., condensing the vapors given off from the reaction mixture during the initial stages of the reaction without returning them to the mixture, collecting the condensate and allowing the condensate to separate into a water layer and a layer containing phenol and furfural and decanting the phenol-furfural layer and returning it to the reaction mixture, and thereafter distilling off the water and reactant vapor without decantation. Numerous advantages flow from this process, as will be set forth hereinafter.

For a better understanding of the invention and the apparatus for practicing it, reference should be had to the figure of the drawing showing a reaction vessel 10 provided with a steam jacket 12 to which steam is admitted from a steam line 14 for heating the vessel. Within the reaction vessel there is provided a stirrer is operated by a motor 18 of any suitable form or construction. The reaction vessel 10 is supplied with the required reactants through an inlet pipe 20 to which separate valved lines 22, 24 and 26 introduce each of the desired reactants such as phenol, furfural and catalyst. It will be appreciated that if additional ingredients are to be introduced into the reaction vessel 10, additional lines may be added to the inlet 20.

The reaction vessel 10 is provided with a vapor conduit 28 enabling vapors, gases, and the like within the vessel to be withdrawn to a condenser 30 which is supplied with cooling water from a line 32, the cooling water being vented through a line 34. Vapors condensed in the condenser 30 flow by gravity to the lower end of the condenser remote from the end thereof to which the vapor conduit 28 is connected and enter the condensate line 36. When a vacuum is to be applied to the condenser, a vacuum conduit 38 is connected to a suitable pump or other source of vacuum. The condensate line 36 passes through a cooler 40 in the form of a coil structure 42 for cooling the condensate to any predetermined temperature. The cooler may be heated or cooled to any suitable degree. Thereafter, the condensate flows down the pipe 44. The pipe 44 is provided with one valve 46 which may be opened to permit the condensate to flow into a collector 48 or when valve 46 is closed, another valve 50 connected to the pipe 44 may be opened to permit the condensate to flow into another conduit 52 leading to a decanter unit 54.

The decanter unit 54 is provided with a partition 56 dividing it into two chambers 58 and 60. The partition is provided with an opening 62 at its lower end permitting the free flow of liquids from one chamber 58 to the other chamber 60. An upper opening 64 is provided at the upper end of the partition to enable the pressure of gas or air in the decanter to be uniform in both of the chambers. Leading to the exterior of the decanter, a withdrawal outlet 66 is connected to the chamber 58 and another withdrawal outlet or pipe 68 connected to the chamber 60, both outlets or pipes 66 and 68 being below the level of the upper opening 64. The withdrawal pipe 68 is placed at a higher level than the withdrawal pipe 66 for a purpose to be set forth in detail subsequently. The withdrawal pipe 66 enables condensate 70 in the chamber 58 to flow back to the reaction vessel. The withdrawal pipe 68 enables an aqueous layer 72 to flow into the collector 48. The water leg 74 in line 66 prevents vapors from the vessel 10 from passing to the decanter 54.

When reacting phenol and furfural in the reaction vessel, vapors of phenol, furfural and water are evolved and they pass through the vapor conduit 28, are condensed in the condenser 30, and the condensate flows to the condensate outlet 36, thence through the cooler 40 and pipe 44 and 52 to the decanter 54. The mixture of phenol, furfural and water separates on entering the decanter and standing for a short period of time. A relatively light water layer containing a small percentage of furfural and a small amount of phenol in solution floats to the top of the mixture in the chamber 60, forming the aqueous layer 72. A layer of greater density composed of furfural-phenol with a small amount of water dissolved therein collects at the bottom of the decanter and flows through the passage 62 into the chamber 58. As the partition 56 is arranged, only the phenol-furfural layer can enter the chamber 58. The surface level of the liquids in the chambers 56 and 60 are not the same because of the lower specific gravity of water. By arranging the withdrawal pipes 66 and 68 so that the outlet of pipe 66 is one or two inches lower than the outlet to pipe 68, an automatic decanting action is secured.

In operation of the apparatus shown in the drawings advantage is taken of the various properties of the system furfural-phenol-water, both in the liquid and in the vapor states. A furfural-water solution boiling at temperatures of above 100° C. and up to 150° C., produces a vapor having a higher concentration of water than is present in the liquid phase. Thus, at 100° C. a furfural solution containing 2% water will evolve a vapor containing 14% water and 86% furfural. Water saturates with a relatively small amount of dissolved furfural at temperatures of below 98° C. For example, at 30° C. water is saturated with approximately 8% furfural by weight. Similarly, below 98° C. furfural is saturated with relatively small amounts of water. At 30° C. furfural will be saturated with 5% of water. In no event will water dissolve more than 15% furfural in the range of temperatures from a 10° C. to 90° C. Similarly, between 10° C. and 90° C., water will not dissolve more than from 8% to 15% of furfural. These solubilities and other properties of the system hold proportionately even though phenol is present in substantial quantities. I have found that phenol is present in the furfural layer in approximately the proportions in the original reacting mixture, but the water content is less than 10% at 30° C. in the phenol-furfural condensate layer and for practical purposes the layer behaves quite similarly to an all furfural-water system. Similarly, the aqueous layer contains less than 10% combined phenol and furfural at 30° C.

I have been able to operate satisfactorily the apparatus in the figure to maintain a decanter temperature of approximately 30° C. At this temperature, furfural saturated with water has a specific gravity of 1.14. Water saturated with furfural at this same temperature has a specific gravity of about 1.009. Therefore, in the decanter 54, the aqueous layer 72 will contain approximately 8% furfural and phenol, an amount that is so small that the layer may be discarded without material economic loss. The furfural-phenol layer 70 contains approximately 5% water and it may be returned to the reaction vessel 10.

In manufacturing the reaction product of phenol and furfural, one mole of phenol is reacted with from 0.5 to 0.9 mole of furfural in producing non-thermosetting resins that may be admixed with a hardener for the purpose of making molding powders and the like.

For the purpose of producing the resins, there may be employed one or more monohydric phenols such as phenol itself, cresol, xylenols and cresylic acid. Suitable catalysts for promoting the resin forming reaction of phenol and furfural are the alkali metal hydroxides, carbonates, and bicarbonates; the alkaline earth metal oxides, hydroxides and carbonates, ammonia and organic amines. Examples of such catalysts are sodium hydroxide, potassium carbonate, magnesium hydroxide, barium oxide, sodium bicarbonate, ethylene diamine, aniline, and ammonia. The amount of catalyst may vary from 0.1 to 5% of the weight of reactants.

The following example is illustrative of the practice of the present invention: Into a 300-gallon reaction vessel, there was charged 160 gallons of a mixture of furfural and phenol in the mole ratio of one mole of phenol to 0.735 mole of furfural, and 2% potassium carbonate, based on the weight of the combined phenol and furfural was added to the charge. The stirrer 16 of the reaction vessel was put into operation and steam was admitted to the jacket 12. In approximately 1 hour and 10 minutes, the temperature of the reactants was approximately 120° C. and exothermic heat was being evolved by the reaction in such amounts that the steam was cut off from the jacket. In 25 minutes, the exothermic heat of reaction had raised the temperature of the charge to 140° C., and vapors of phenol, furfural and water passed through the vapor conduit 28 to the condenser 30. The vapors were condensed therein and conveyed into the decanter 54. In a short period phenol and furfural condensate was formed in a sufficient amount to fill the withdrawal pipe 66 and began to flow into the reaction vessel 10. Vapor condensation and decantation continued for 1 hour under the exothermic heat supplied by the reaction which maintained the temperature between 130° C. and 140° C. Then the temperature of the vessel began to drop indicating that the exothermic heat was then being evolved at a rate insufficient to keep up the temperature of the charge. This temperature drop indicates that the phenol-furfural polymer product had reached a desired stage of resinification. Steam was again admitted to the jacket 12 at approximately 2½ hours from the start of the process. Vacuum was applied to the condenser 30, and thereby to the vessel 10, by connecting it to the vacuum conduit 38. The temperature of the reaction product in the vessel was maintained at approximately 140° C. during the vacuum treatment. Valve 50 was closed and valve 46 was opened at the time of applying vacuum so that all of the condensate would go into the collector 48. The purpose of this was to remove any unreacted phenol, furfural and low volatile polymers from the product, thereby producing an improved resin in the vessel. A vacuum of from 10 inches to 2 inches of mercury absolute pressure, was applied—the higher vacuum toward the end of the reaction. In approximately 1½ hours, substantially all the water had been removed from the reaction mixture and the phenol and furfural had reacted into a resinous material having a ball and ring temperature of 107° C. The vacuum was then broken and the batch of resin in the vessel was discharged through a valve 80 at the bottom of the vessel 10 into a pan and cooled until it solidified. Thereafter, it was crushed and was found eminently suitable for producing a moldable composition when combined with fillers, such as wood flour or asbestos fiber, hardeners, such as hexamethylene tetramine, and the other usual additives such as mold lubricants, and dyes. It formed an excellent moldable thermosetting composition superior to previously available phenol-furfural resins in uniformity and high quality.

The condensate removed during the vacuum dehydration period contained little free water and comprised approximately 15 gallons of a phenol, furfural and low polymers of phenol-furfural that could be readily separated from the free water. This condensate material was suitable for making up a succeeding charge since the vapor condensation and decantation step in the initial portion of the reaction enable water to be removed promptly so that high reaction temperatures are reached rapidly—in a few minutes.

By contrast with the process of the present invention, phenol was reacted with furfural in an identical amount and in the proportions of the preceding example using, however, conventional refluxing practice. After initially heating the reaction mixture as in the preceding example until exothermic heat of reaction was sufficient to shut off the steam, refluxing was started and carried on for three hours. During refluxing, the temperature did not exceed 128° C. at any time and dropped to 112° C. toward the end of the three-hour period. When the reaction product had been refluxed adequately, it was then subjected to vacuum dehydration, at approximately 3½ hours after starting the reaction. It was then vacuum dehydrated for approximately four hours accompanied by external applications of steam to the vessel 10 to heat the reaction product. Seven and one-half hours after initiating the reaction, the resin had reached the desired ball and ring temperature of 116° C. and was then discharged from the reaction vessel and cooled. However, during the vacuum dehydration of this batch, approximately 28 gallons of phenol and furfural containing low polymers thereof and substantial amounts of water was condensed. This large quantity of material was not suitable for adding to subsequent charges using this process and it was necessary to discard all of it.

Accordingly, the process of the present invention requires approximately half as long a time to produce the same end product and there is very little, if any, waste of the reactants employed whereas the previously known processes produced considerable amounts of waste material.

Heating the phenol and furfural between 120° C. and 150° C., condensing the vapors and decanting the phenol-furfural layer from the condensate and returning it to the reaction vessel are important features of the present invention since they enable the reaction temperatures to be maintained at a higher level than can be maintained by refluxing process wherein all the water is returned to the reaction mixture. Maintenance of higher temperatures provides a more complete and uniform reaction of the phenol and furfural in a shorter period of time so that when vacuum dehydration is employed to remove the water of reaction, there is half as much reactants and low polymers removed during the vacuum dehydration.

Since certain obvious changes may be made in the above procedure and different embodiments of the invention could be made without departing from the scope thereof, it is intended that all matter contained in the above description shall be interpreted as illustrative and not in a limiting sense.

I claim as my invention:

1. In the process of rapidly and efficiently reacting phenol with furfural into a resinous product, the steps comprising heating to a temperature of from 120° C. to 150° C. a mixture of phenol and furfural admixed with an alkaline catalyst promoting the reaction thereof into a resin, vapors of phenol, furfural and water being evolved during heating, condensing the vapors, collecting the condensate in a standing body allowing the condensate to cool and separate into a water layer containing a small percentage of furfural and some phenol, and a furfural-phenol layer containing a small percentage of water, decanting and returning only the furfural-phenol layer to the reaction mixture, whereby the reaction mixture temperature is maintained at from 120° C. to 150° without substantial loss of reactants, the condensation, decantation and return of only the furfural-phenol layer being continued until the exothermic heat of the reaction is insufficient to maintain the temperature of from 120° C. to 150° C., and the temperature drops, then applying heat and vacuum to the reaction product to vaporize phenol, furfural, low polymers thereof and a small amount of water, condensing these last-mentioned vapors without returning them to the reaction mixture, until a desired degree of resinification of the phenol-furfural has taken place, then cooling the resulting reaction product, and thereafter preparing another batch of the reaction product using the last-mentioned condensed vapors as a part of the reaction charge.

2. In the process of rapidly and efficiently reacting phenol and furfural into a moldable resin, the steps comprising admixing one mole of phenol, from 0.5 to 0.9 mole of furfural and from 0.1 to 5% by weight of an alkaline catalyst promoting resinification of the ingredients, heating the mixture to a temperature of approximately 120° C. at which point the exothermic heat of the reaction is sufficient to maintain the temperature of the mixture between 120° C. and 150° C., vapors of phenol, furfural and water being given off during such heating, condensing the vapors and collecting the condensate in a standing body, cooling and allowing the condensate to separate into a water layer containing a small percentage of furfural and some phenol and a furfural-phenol layer containing a small percentage of water, decanting and returning only the furfural-phenol layer to the reaction mixture, the condensation, decantation and return of the furfural-phenol being continued for a period of from about ½ to 2 hours until the exothermic heat of reaction is insufficient to maintain the required reaction mixture temperature of from 120° C. to 150° C., then applying external heat and a vacuum to the reaction mixture to vaporize phenol, furfural, low polymers thereof and a small amount of water, condensing these last-mentioned vapors without returning them to the reaction vessel, the vacuum treatment being applied for at least one hour until the resinous phenol-furfural reaction product has a ball and ring temperature of from 80° C. to 125° C., and thereafter preparing another batch of the reaction product using the last-mentioned condensed vapors as a part of the reaction charge.

JACK McDONALD.

References Cited in the file of this patent

UNITED STATES PATENTS

| Number | Name | Date |
|---|---|---|
| 1,648,558 | Meston | Nov. 8, 1927 |
| 1,778,326 | Kutzer | Oct. 14, 1930 |
| 1,793,715 | Novotny | Feb. 24, 1931 |
| 1,917,248 | Hanson | July 11, 1933 |
| 1,969,890 | Kurath | Aug. 14, 1934 |
| 2,498,656 | De Groote | Feb. 28, 1950 |
| 2,566,851 | Novotny | Sept. 4, 1951 |